INVENTORS
MICHAEL F. MARX
RICHARD G. BUSCHER

BY Claude Funkhouser

ATTORNEY

United States Patent Office 3,404,345
Patented Oct. 1, 1968

3,404,345
FREQUENCY DEVIATION SENSING DEVICE
Michael F. Marx, Apalachin, and Richard G. Buscher, Vestal, N.Y., assignors, by mesne assignments, to the United States of America as represented by the Secretary of the Navy
Filed Oct. 29, 1964, Ser. No. 407,600
7 Claims. (Cl. 328—141)

ABSTRACT OF THE DISCLOSURE

This invention is directed to a system for measuring the deviation of a frequency variable signal from a reference frequency. The system utilizes a detector which gives a pulse output when the input signal makes a zero crossing. Two flip-flops are triggered by the pulse output. These in turn control the operation of two integrators. The integrators are alternatively operable to give an output which is a function of the time interval between pulses from the detector. A comparator compares the outputs of the integrators with a reference signal representing the desired time interval. The comparator yields an output which is proportional to the difference between the reference signal and the integrator signal.

---

This invention relates to time interval measurement and more particularly to a device to determine the time interval between zero crossings of a time varying signal and to provide a signal which is a function of the deviation of the time interval from some reference time.

Measurement of time intervals between zero crossings provides a practical and accurate method for measuring the frequency of a periodic waveform. Suitable applications of such a device are in the control of generators, motors, and other rotating machinery, or in the measurement of frequency shift in Doppler radar and sonar. The particular use contemplated for the present invention, however is in the field of self adaptive control for aircraft where frequency sensors are needed to monitor the system behavior.

Various prior art techniques for measuring frequency and deviation from a reference frequency exist but in general they suffer from one or more defects. Typical prior art difficulties eliminated by the present invention include undesirable amplitude and noise sensitivity, slow or delayed readout, inaccuracy at low frequencies, inability to alter the nature of the output function without affecting device operation, and the need for special components and techniques in mechanizing the device.

It is an object of this invention to provide a rapid reading, low frequency, sensing device capable of providing an output signal which is a function of the deviation of the input frequency from a pre-established reference.

It is a further object of this invention to provide a device to measure the time interval between zero crossings of a periodic waveform and to provide an output signal indicative of the departure of that time period from a pre-established reference.

It is a further object of this invention to provide a suitable frequency sensor for use in a self-adaptive automatic control system for aircraft.

The present invention attains the above objects by providing a zero crossing detector and a pair of integrators to measure the time interval between alternate zero crossings. Control of the system is provided by a novel arrangement of digital circuitry which permits measurement of a time interval, output comparator, and readout during the succeeding time interval while the second integrator is measuring its time interval.

Other objects and advantages of the invention will hereinafter becomes more fully apparent from the following description of the annexed drawings, which illustrate a preferred embodiment, and wherein.

Figure 1:
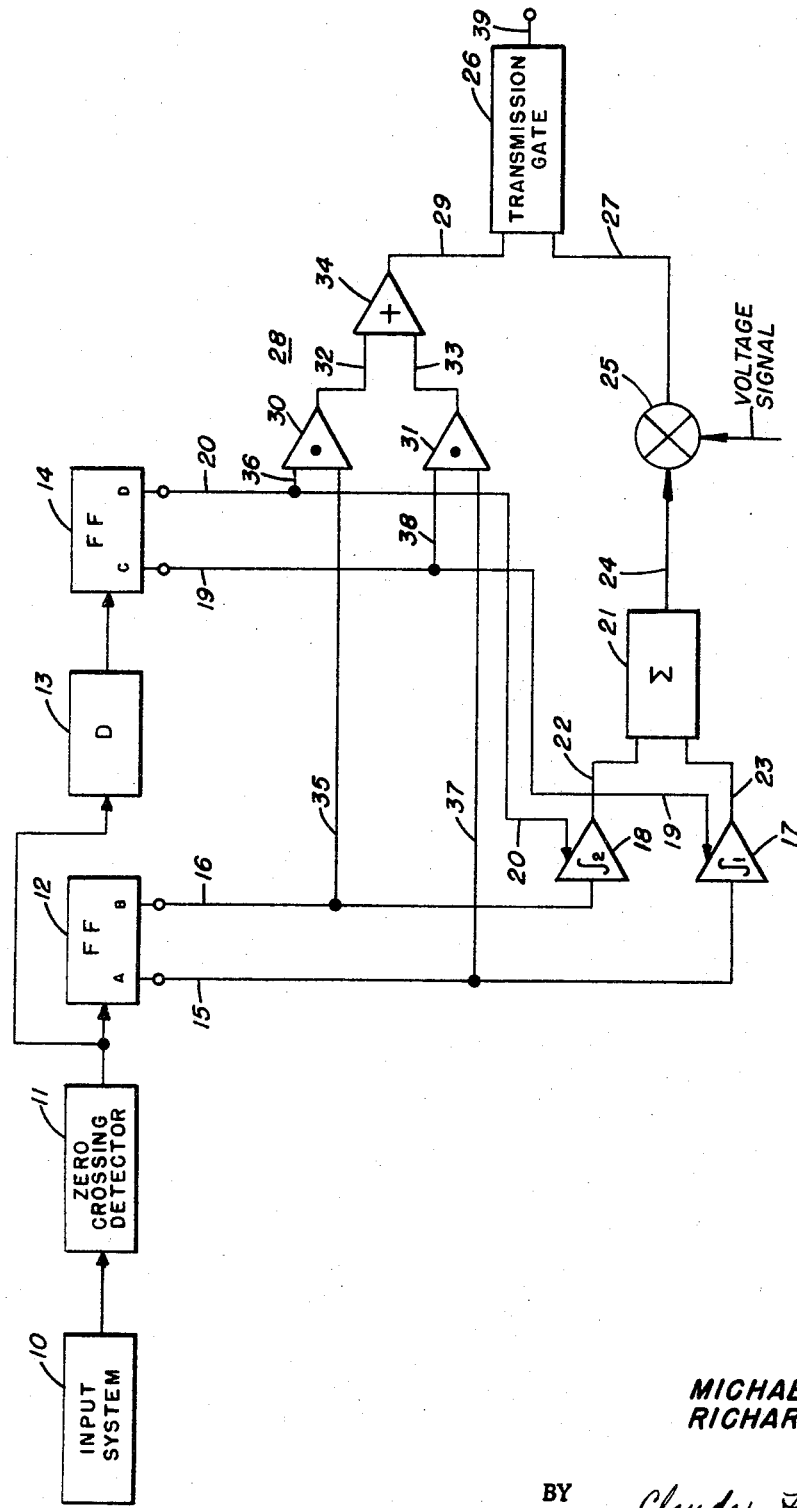
FIG. 1 shows a block diagram of the frequency sensor and comparator of the present invention.

Referring now to FIG. 1, the invention is seen to comprise a zero crossing detector 11 connected to flip-flop 12 and through delay 13 to flip-flop 14. Leads 15 and 16 connect the input terminals of a pair of integrating circuits 17 and 18 to terminals A and B of flip-flop 12, and leads 19 and 20 connect the reset terminals of integrating networks 17 and 18 to terminals C and D of flip-flop 14. The outputs of the integrators 17 and 18 are connected to summing circuit 21 over leads 22 and 23. The summing network 21 is connected over lead 24 to output comparator 25. Output transmission gate 26 is provided with the output of the comparator 25 over lead 27 and with the output of gating circuitry 28 over lead 29. Gating circuit 28 comprises AND gates 30 and 31 connected over leads 32 and 33 to OR gate 34. The inputs to AND gate 30 are provided from terminals B and D of flip-flops 12 and 14 over leads 35 and 36 and the inputs for AND gate 31 are provided from terminals A and C of flip-flops 12 and 14 over leads 37 and 38.

Zero crossing detector 11, flip-flops 12 and 14, delay 13, AND gates 30 and 31, as well as OR gate 34 may be standard digital components. Integrators 17 and 18 may be of any known form. For example, a capacitor or an operational amplifier having capacitive feedback, and provided with suitable blocking diodes and discharge circuitry may be used. Summing network 21 may be any suitable operational amplifier with resistive inputs and resistive feedback. Comparator 25 may be of any desired type, and its simplest form may comprise an adder with an opposite polarity bias equivalent to the reference frequency or time period. Gate 26 may be any suitable transmission circuit which will pass a signal provided at lead 27 in response to an unblocking signal over lead 29.

The exact nature of the input system 10 will, of course, depend on the particular use to which the system is being put. Any source of periodic signal is suitable, the only requirement being that the signal level predominate over the noise level. If small frequency deviations are to be measured, then a band pass filter may be provided in the input so that signals in the reference frequency region will be predominant. For use in an aircraft flight control system as intended for the present invention, the input signal is provided by an accelerometer. Obviously then, it can be seen by those skilled in the art, that various input circuits may be used within the scope and spirit of this invention.

Figure 2:
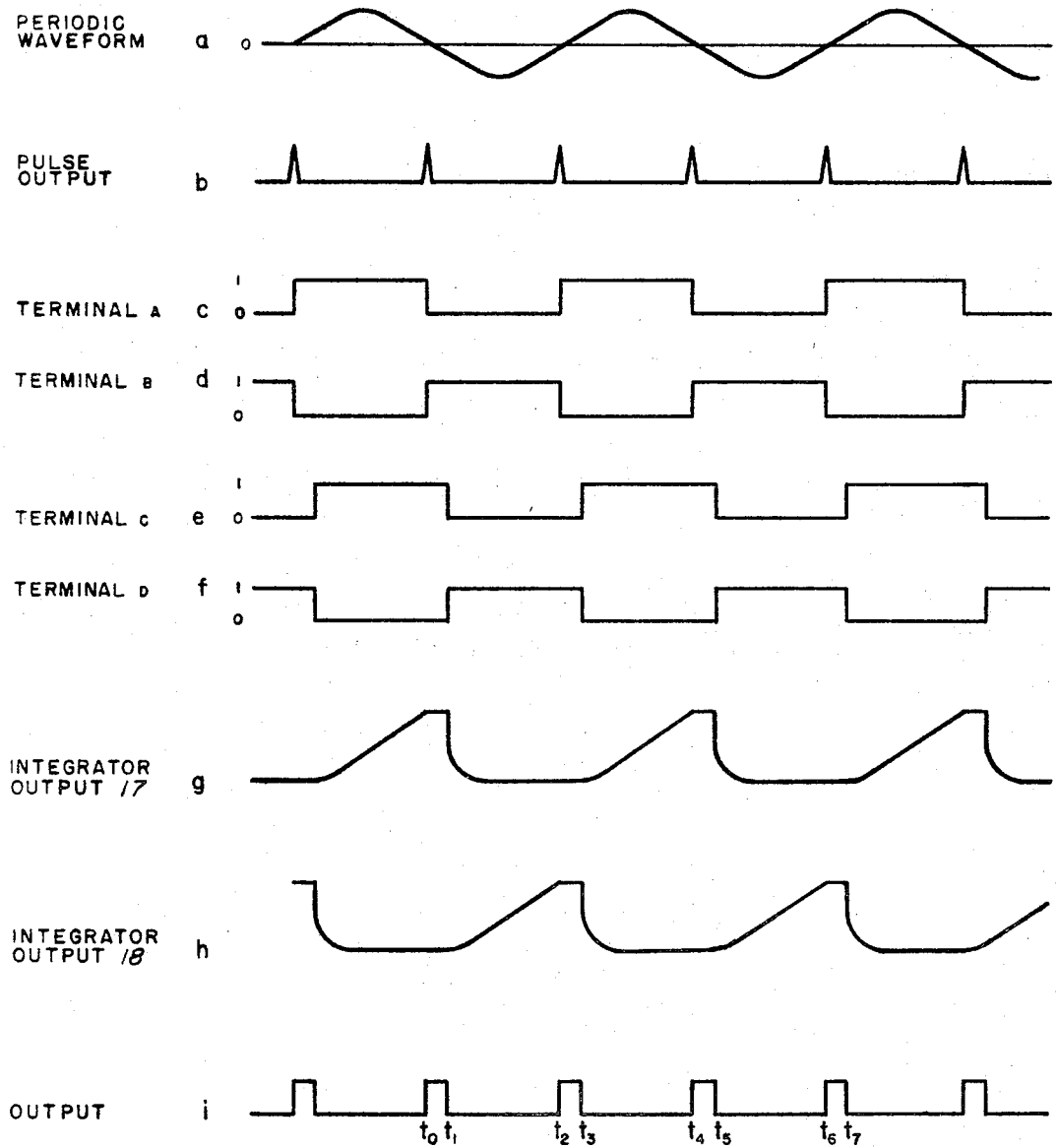
FIG. 2 is a chart of waveforms useful in explaining the operation of the invention.

The operation of the device of this invention may be best understood by consideration of FIG. 2 which shows various waveforms which appear within the system. FIG. 2a shows a typical input signal which may be provided to zero crossing detector 11. While a sine wave has been shown, it should be recognized that any periodic waveform may be used as long as it possess distinctive zero crossings and as long as the primary mode is predominant over the noise. The output of zero crossing detector 11 is shown in FIG. 2b as a pulse output every time the input waveform changes polarity. Flip-flops 12 and 14 are of a complementing type; therefore every output pulse from zero crossing detector 11 changes the level at terminals A and B of flip-flop 12. After a time delay $T_d$ provided by delay network 13, flip-flop 14 is also complemented thereby switching its outputs C and D. As is readily apparent, there are four possible combinations of outputs A, B, C and D. These states are summarized in Table I shown below.

TABLE I.—CONDITION CONTROL STATES

| Condition | A | B | C | D | Integrator 17 | Integrator 18 | Output Gate |
|---|---|---|---|---|---|---|---|
| I | 0 | 1 | 0 | 1 | Reset | Integrate | Blocked. |
| II | 1 | 0 | 0 | 1 | do | Read | Unblocked. |
| III | 1 | 0 | 1 | 0 | Integrate | Reset | Blocked. |
| IV | 0 | 1 | 1 | 0 | Read | do | Unblocked. |

CONDITION I

Assuming a "one" level to be positive and a "zero" level to be ground, it may be seen that upon initiation of condition I, positive signals are applied by terminal B of flip-flop 12 to the input terminal of integrator 18, and by terminal D of flip-flop 14 to the reset terminal of integrator 18. If the integrators are arranged so that a positive signal at the reset input unblocks the integrator, then it must be seen that integrator 18 will provide on lead 22 a linear ramp waveform. This circuit state is shown commencing at the times $t_1$ and $t_5$ in FIG. 2, the voltage appearing at terminals A through D of flip-flops 12 and 14 being shown in FIGS. 2c to 2f, respectively, and the signal on lead 22 being shown in FIG. 2h.

During this period the output of integrator 17 is clamped to ground by the zero level of the signal at terminal C applied to the reset lead 19. Thus, the signal appearing on lead 29 is the same as that appearing on lead 22, and in the simplest case, the output of comparator 25 will be a ramp having a DC bias.

Signals A and C are provided to AND gate 31 and signals B and D are provided to AND gate 30. AND gate 30 conducts, providing a signal over lead 32 to OR gate 34 which provides an inhibit signal to the control terminal of transmission gate 26. Therefore, as seen in FIG. 2i, no signal is present at output terminal 39 during this interval.

CONDITION II

The next zero crossing (for example, at times $t_2$ or $t_6$ in FIG. 2) complements flip-flop 12 and initiates condition II. The input to integrator 18 is now zero, and since the integrator has not been reset, the signal on lead 22 becomes a DC level as shown by FIG. 2h. The output of integrator 17 remains clamped to ground because of the zero level at terminal C, therefore the output of comparator 25 is a DC level whose amplitude may be indicative of the duration of the integration period or, as in the present case, of the difference between the integration period and a reference time.

At the same time, it may be seen that neither AND gate 30 or 31 provides an output. Therefore, no signal appears on lead 29 and gate 26 becomes unblocked. Therefore, the DC level on lead 27 passes to the output as seen in FIG. 2i.

CONDITION III

At a time $T_d$ after flip-flop 12 is contemplated, delay 13 causes flip-flop 14 to be complemented, thereby initiating condition III. During this period, integrator 18 is reset and integrator 17 is permitted to operate because signal C is no longer at ground. The output on lead 24 is now entirely a result of the linear ramp appearing on lead 23 (see FIG. 2g beginning at times $t_3$ or $t_7$), and the output of comparator 25 is, as during condition I, a linear ramp with a DC bias. Gate 26 is blocked since AND gate 31 provides an output signal to OR gate 34 and, as seen in FIG. 2, the signal at terminal 39 returns to zero.

CONDITION IV

The next zero crossing causes flip-flop 12 to be complemented, stopping integrator 17 and unblocking gate 26 as shown beginning at times $t_0$ and $t_4$ in FIG. 2i. At a time $t_d$ later, flip-flop 14 also switches again and condition I is reinitiated.

Thus, it may be seen that as successive zero crossing occur, the device cycles through its four states providing at each zero crossing an output pulse of duration $T_d$ whose amplitude is proportional to the difference between the time since the last zero crossing and a reference interval. While it is noted that the integration does not begin precisely at the time of the zero crossing (since the integrator remains clamped for a time $T_d$ while the previous integration is read out), this may be compensated for by a suitable DC bias added to the comparator. The output then is in fact representative of the time difference.

Referring again to Table I, the operation of the device may be summarized by noting that during condition I, integrator 17 is reset and integrator 18 is operating, during condition II integrator 17 remains reset while integrator 18 reads out its previous result, during condition III integrator 17 is operating and integrator 18 is reset, and during condition IV, integrator 17 reads out its previous result while integrator 18 remains reset. As indicated, successive zero crossings result in a continuous cycling of the device thru conditions I, II, III and IV, providing successive readouts of the previous time periods.

As an example of the range over which this device is expected to operate, the flight control system of which this may be a part provides an input signal which, on a statistical basis, is centered around approximately three cycles per second. Accordingly, zero crossings will occur approximately every 0.16 second. Time period $T_d$ is intentionally made as short as possible. In the particular embodiment shown the period is chosen to be approximately 0.01 second. Of course, other time periods and other ranges of frequencies may be used without departing from the scope of this invention.

It should be understood, of course, that the foregoing disclosre relates to only a preferred embodiment of the invention and that it is intended to cover all changes and modifications of the example of the invention herein chosen for the purpose of disclosure, which do not constitute departures from the spirit and scope of the invention.

What is claimed is:

1. A frequency deviation sensor for periodic waveforms comprising:
    means to detect a periodic characteristic of the waveform and to provide a pulse output upon each occurrence;
    a plurality of identical timing devices each of whose output is a function of its operating time;
    a plurality of control means connected to the detecting means and the timing devices and sequentially operable in response to successive pulse outputs from the detector to initiate operation of one of the timing devices and to reset another of the timing devices; and
    output means for receiving the output of the timing devices and comparing it with a reference signal whereby deviation is indicated when the signal from the timing means differs from reference signal.

2. A frequency deviation sensor for periodic waveforms as in claim 1 wherein:
    two timing devices and two control means are utilized;
    the first control means initiating operation of the timing devices and the second control means resetting the timing devices.

3. The frequency deviation sensor of claim 2 wherein the first and second time measuring means provide time integrations of input voltages; and wherein the two control means are operable to clamp the output of the integrator to be reset to the level attained at the time of the pulse output; and include means for delaying the operation of one integrator and for delaying the resetting of the other integrator for a fixed time interval following the pulse output.

4. The frequency deviation sensor of claim 3 including:

output circuitry connected to the integrators including gating circuitry normally in a blocked condition;

means connected to each of the control means and to the output circuitry to unblock the gating circuitry during the fixed time interval following the pulse output.

5. The frequency deviation sensor of claim 4 wherein the output circuitry further includes:

a comparator whose output is representative of the difference between the recurrence period of the detected characteristic and a reference period.

6. A frequency sensor for periodic waveforms comprising:

means to detect zero crossings of the periodic waveform and to provide a pulse signal in response thereto;

a condition control circuit including a first complementing flip-flop connected to the zero crossing detector;

a delay network having a fixed delay interval connected to the zero crossing detector;

a second complementing flip-flop connected to the delay network;

each flip-flop having first and second outputs;

first and second integrating means, each having input and reset terminals;

means connecting the first and second outputs of the first flip-flop to the input terminal of the first and second integrating means, respectively;

means connecting the first and second outputs of the second flip-flop to the reset terminal of the first and second integrating means, respectively;

output circuitry connected to the two integrating means including a gating circuit normally in a blocked condition; and means connected to the outputs of the flip-flops to provide an unblocking signal for the gating circuit during the fixed delay interval commencing with the reception of a pulse signal.

7. The frequency sensor of claim 6 wherein the output circuitry includes a comparator to provide an indication of the variation of the time between zero crossings from a predetermined reference time.

References Cited

UNITED STATES PATENTS 3,005,963  10/1961  Empile _____ 331—113
3,183,368  5/1965   Ross _____ 331—13 X ARTHUR GAUSS, *Primary Examiner.*

J. D. FREW, *Assistant Examiner.*